US010579620B2

(12) United States Patent
Bellizia et al.

(10) Patent No.: US 10,579,620 B2
(45) Date of Patent: *Mar. 3, 2020

(54) DYNAMIC MANAGEMENT OF MEMORY ALLOCATION IN A DATABASE

(71) Applicant: INTERNATIONAL BUSINESS MACHINES CORPORATION, Armonk, NY (US)

(72) Inventors: Valerio Bellizia, Carpineto Romano (IT); Stefano Sidoti, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,351

(22) Filed: May 1, 2018

(65) Prior Publication Data
US 2018/0253248 A1    Sep. 6, 2018

Related U.S. Application Data

(63) Continuation of application No. 15/376,020, filed on Dec. 12, 2016, now Pat. No. 9,996,293.

(51) Int. Cl.
*G06F 12/00* (2006.01)
*G06F 16/2453* (2019.01)
(Continued)

(52) U.S. Cl.
CPC ...... *G06F 16/24549* (2019.01); *G06F 3/0607* (2013.01); *G06F 3/0631* (2013.01); *G06F 3/0673* (2013.01)

(58) Field of Classification Search
CPC .... G06F 3/0631; G06F 3/0607; G06F 3/0673; G06F 17/30474
See application file for complete search history.

(56) References Cited

U.S. PATENT DOCUMENTS 7,007,150 B2    2/2006    Valentin et al.
7,318,076 B2    1/2008    Chen et al.
(Continued)

FOREIGN PATENT DOCUMENTS

WO    WO2014074170    5/2014

OTHER PUBLICATIONS

Dageville, et al., "SQL Memory Management in Oracle9i", Proceedings of the 28th VLDB Conference, Dec. 2002, 12 pages.
(Continued)

*Primary Examiner* — Mark A Giardino, Jr.
(74) *Attorney, Agent, or Firm* — Tutunjian & Bitetto, P.C.; Jeffrey S. LaBaw (57) ABSTRACT

A method is provided for managing memory allocation in a database. The method determines a preferred statement among defined statements with defined sizes of objects. The defined statements include (i) a stored statement defined to allocate the objects and stored in the database wherein each of the objects have a stored size, and (ii) alternative stored statements that provide an alternative implementation of the stored statement defined to allocate the objects with alternative sizes lower than stored sizes. The preferred statement has defined sizes compliant to actual sizes according to preference criterion based on comparing defined and actual sizes. The method invokes the preferred statement for execution in place of the stored statement when different. The method stores a new statement, having new sizes compliant to actual sizes according to alternate criterion, responsive to unfullfilling a condition based on comparing defined sizes of the preferred statement with actual sizes.

20 Claims, 6 Drawing Sheets

(51) Int. Cl.
  *G06F 13/00* (2006.01)
  *G06F 13/28* (2006.01)
  *G06F 3/06* (2006.01)

(56) References Cited

U.S. PATENT DOCUMENTS

| | | |
|---|---|---|
| 7,395,371 B2 | 7/2008 | Nemoto et al. |
| 7,664,799 B2 | 2/2010 | Mukherjee et al. |
| 7,991,765 B2 | 8/2011 | Gui et al. |
| 8,122,046 B2 | 2/2012 | Chang et al. |
| 8,943,259 B2 | 1/2015 | Weissman et al. |
| 9,104,663 B1 | 8/2015 | Narayanan et al. |
| 2008/0104319 A1 | 5/2008 | Hu et al. |
| 2009/0150338 A1 | 6/2009 | Fortsie et al. |
| 2009/0222460 A1 | 9/2009 | Leclercq et al. |
| 2013/0290595 A1 | 10/2013 | Weissman et al. |
| 2015/0149514 A1 | 5/2015 | Kim et al. |

OTHER PUBLICATIONS

IBM,"Memory allocation in DB2", available at: https://www.ibm.com/support/knowledgecenter/api/content/nl/en-us/, last downloaded May 25, 2016, pp. 1-3.

"SQLite, Dynamic Memory Allocation in SQLite", availabel at: https://www.sqlite.org/malloc.html, last downloaded May 25, 2016, pp. 1-16.

List of IBM Patents or Patent Applications Treated as Related dated May 1, 2018, 2 pages.

DYNAMIC MANAGEMENT OF MEMORY ALLOCATION IN A DATABASE

BACKGROUND

Technical Field

The present invention generally relates to databases, and more particularly to dynamic management of memory allocation in a database.

Description of the Related Art

The background of the present invention is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present invention.

Databases are commonly used to store large amount of data in structured form (for example, organized in schemas, tables and views in relational databases); the databases define the data at a logical (or conceptual) level, which abstracts the data from their actual representation at a physical (or internal) level.

The databases generally allow pre-defining and saving stored statements (for example, stored procedures), which may then be invoked by any clients accessing the databases (for example, software applications). The stored statements consolidate and centralize logic for common operations, so as to avoid their repeated implementation in the software applications and their repeated compilation at every invocation thereof.

The databases may support different types of memory allocation to obtain memory required for their operation; with reference in particular to the stored statements, the memory allocation defines how the databases obtain the memory for storing objects relating to the execution of the stored statements (for example, their parameters).

Particularly, some databases use a dynamic memory allocation, wherein a size of the objects relating to the execution of the stored statements is defined at runtime; this allows managing the memory available to the databases efficiently. However, the leveraging of the dynamic memory allocation by the software applications increases their complexity.

Conversely, some databases use a static memory allocation, wherein the size of the objects relating to the execution of the stored statements is pre-defined; this simplifies the software applications. However, the static memory allocation may cause a shortage or a waste of the memory available to the databases.

In both cases, the software applications should be designed according to the memory allocation that is supported by the databases (in order to access them correctly). As a result, the software applications are strictly tied to the databases that are used. Particularly, this significantly increases the complexity of the software applications that are designed to work with multiple databases (using different types of memory allocation). In any case, software applications originally designed to work with a specific database are to be significantly re-designed when they are ported to another database using a different type of memory allocation.

All of the above is especially evident in case the execution of the stored statements involves the use of Large OBjects (LOBs); the large objects are stored in the database as single entities, which have a very high limit for their size (for example, up to several Gbytes). For example, the large objects may be used to store binary data such as images, audio (also known as Binary LOBs, or BLOBs) or to store texts (also known as Character LOBs, or CLOBs).

Indeed, any use of the large objects (following the invocation of the corresponding stored statements) may involve the allocation of a very high amount of memory; for example, this happens in the static memory allocation when the databases allocate the large objects with the size equal to a maximum value that is allowed. Therefore, even a relatively small number of invocations of the stored statements involving the allocation of large objects may case a shortage of the memory that is available to the databases.

These situations are quite difficult (if not impossible) to predict in advance; as a result, they are generally discovered only at runtime when corresponding exceptions are raised by the databases. All of the above has a detrimental effect on the reliability of the databases, and then of the software applications accessing them.

SUMMARY

According to an aspect of the present invention, a method is provided for managing memory allocation in a database. The method includes determining a preferred statement among one or more defined statements with defined sizes of objects. The defined statements include (i) a stored statement defined to allocate the objects and stored in a database wherein each of the objects have a stored size, and any (ii) alternative statements stored in the database. Each of the alternative statements provide an alternative implementation of the stored statement that is defined to allocate the objects with alternative sizes at least in part lower than corresponding stored sizes. The preferred statement has the defined sizes compliant to corresponding actual sizes according to a preference criterion based on a comparison of the defined sizes with the actual sizes. The method additionally includes invoking the preferred statement for execution. The preferred statement is invoked in place of the stored statement when different therefrom. The method further includes storing a new alternative statement in the database in response to a missing fulfillment of a matching condition based on a comparison of the defined sizes of the preferred statement with the actual sizes. The new alternative statement has new alternative sizes that are compliant to the corresponding actual sizes according to an alternative criterion.

According to another aspect of the present invention, a computer program product is provided for managing memory allocation in a database. The computer program product includes a computer readable storage medium having program instructions embodied therewith. The program instructions are executable by a computing system to cause the computing system to perform a method. The method includes determining a preferred statement among one or more defined statements with defined sizes of objects. The defined statements include (i) a stored statement defined to allocate the objects and stored in a database wherein each of the objects have a stored size, and (ii) any alternative statements stored in the database. Each one of the alternative statement provide an alternative implementation of the stored statement that is defined to allocate the objects with alternative sizes at least in part lower than corresponding stored sizes. The preferred statement has the defined sizes compliant to corresponding actual sizes according to a preference criterion based on a comparison of the defined sizes with the actual sizes. The method additionally includes invoking the preferred statement for execution. The preferred statement is invoked in place of the stored statement when different therefrom. The method further includes storing a new alternative statement in the database in response to a missing fulfillment of a matching condition based on a comparison of the defined sizes of the preferred statement with the actual sizes. The new alternative statement has new alternative sizes that are compliant to the corresponding actual sizes according to an alternative criterion.

According to yet another aspect of the present invention, a system is provided for managing memory allocation in a database. The system includes a circuitry for determining a preferred statement among one or more defined statements with defined sizes of objects. The defined statements include (i) a stored statement defined to allocate the objects and stored in a database wherein each of the objects have a stored size, and (ii) any alternative statements stored in the database. Each one of the alternative statements provide an alternative implementation of the stored statement being defined to allocate the objects with alternative sizes at least in part lower than corresponding stored sizes. The preferred statement have the defined sizes compliant to corresponding actual sizes according to a preference criterion based on a comparison of the defined sizes with the actual sizes. The system additionally includes a circuitry for invoking the preferred statement for execution. The preferred statement is invoked in place of the stored statement when different therefrom. The system further includes a circuitry for storing a new alternative statement in the database in response to a missing fulfillment of a matching condition based on a comparison of the defined sizes of the preferred statement with the actual sizes. The new alternative statement has new alternative sizes that are compliant to the corresponding actual sizes according to an alternative criterion.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

With reference in particular to FIG. 1A-FIG. 1D, the general principles are shown of the solution according to an embodiment of the present disclosure.

Figure 1A:
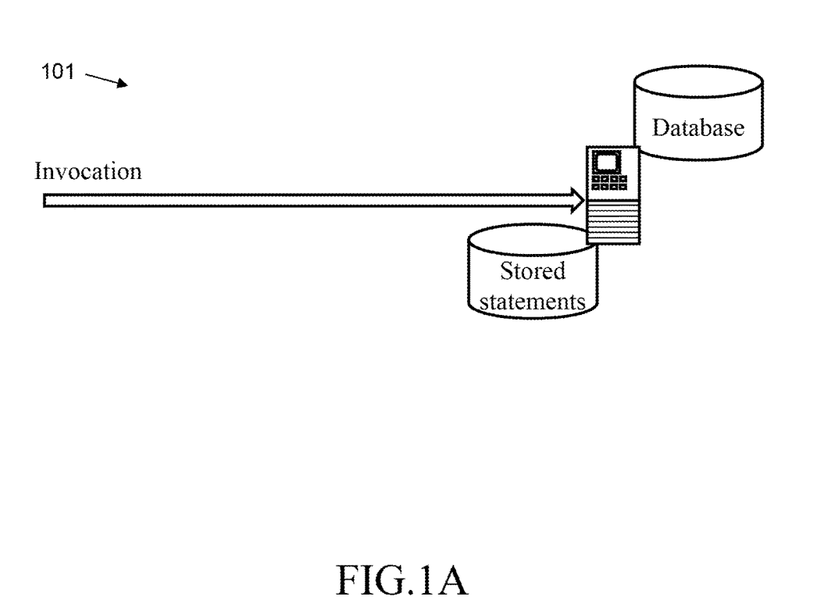
FIG. 1A-FIG. 1D show the general principles of the solution according to an embodiment of the present disclosure.

Starting from FIG. 1A, a database 101 (for example, of the relational type) stores one or more stored statements. The stored statements implement operations that are pre-defined and saved in the database 101 (for example, already compiled); the stored statements may be stored procedures, user-defined functions (UDFs), prepared queries for performing common operations, such as data validation, access control. Each stored statement is defined so as to allocate one or more objects relating to its execution every time the stored statement is invoked; the database use a static memory allocation, wherein each object is allocated with a pre-defined size. Any client accessing the database 101 (for example, a software application) may submit an invocation of any stored statement for its execution.

Figure 1B:
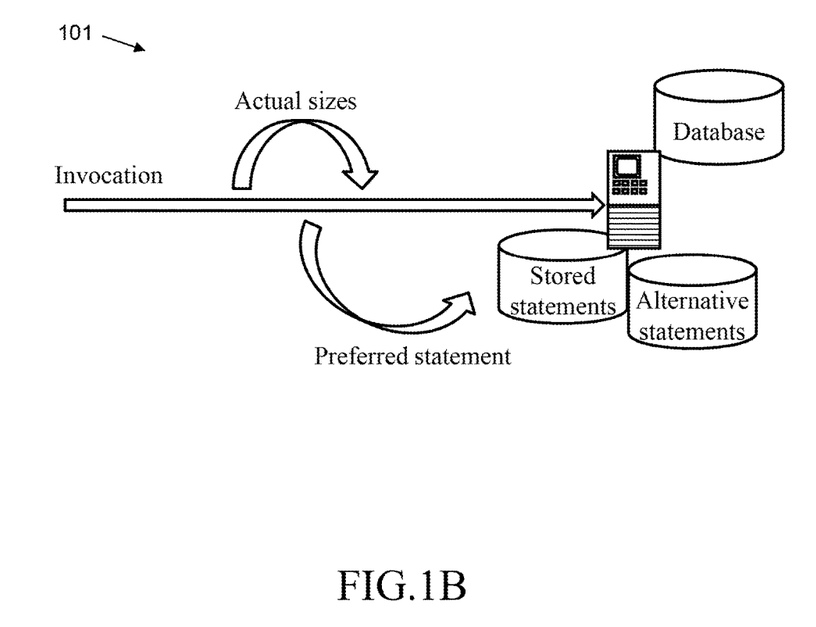

Moving to FIG. 1B, in the solution according to an embodiment of the present disclosure, in response thereto an actual size (relating to the invocation of the stored statement) of the objects, or at least part thereof, is determined (for example, parameters passed to the stored statement). At this point, a preferred statement is determined among one or more defined statements (with defined sizes of the same objects); the defined statements comprise the stored statement and any alternative statements that are stored in the database for it (as described in the following). Each alternative statement provides an alternative implementation of the stored statement, i.e., it is functionally equivalent thereto (for example, as an overloading thereof); however, the alternative statement is defined to allocate the objects of the stored statement with alternative sizes that are at least in part lower than the corresponding stored sizes. The preferred statement is the defined statement with the memory allocation of its objects that best matches the invocation of the stored statement (for example, minimizing the difference of the defined sizes from the actual sizes).

Figure 1C:
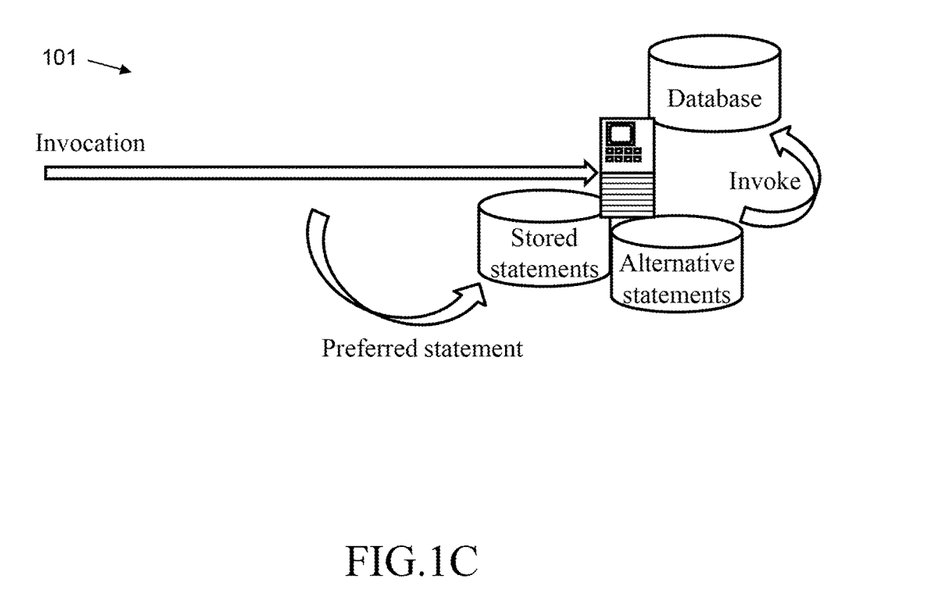

Moving to FIG. 1C, the preferred statement is invoked for execution on the database 101; therefore, if the preferred statement is different from the stored statement, i.e., it is an alternative statement thereof, this alternative statement is executed in place of the stored statement.

Figure 1D:
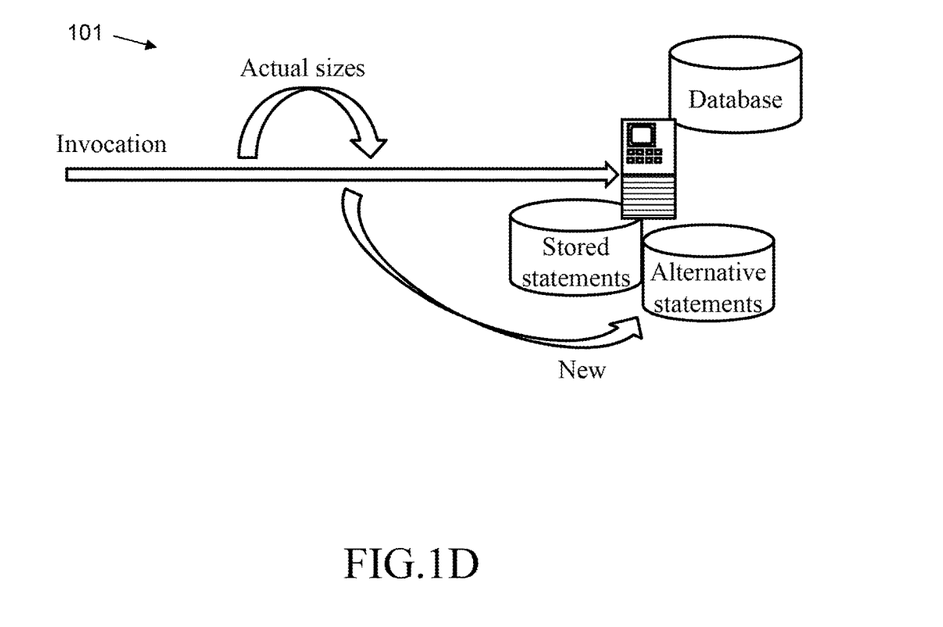

Moving to FIG. 1D, a new alternative statement is stored in the database 101 if the memory allocation of the preferred statement significantly differs from the invocation of the stored statement (for example, if the same difference of the defined sizes from the actual sizes exceeds a threshold). The new alternative statement has its (new) alternative sizes that are compliant to the corresponding actual sizes according to an alternative criterion (for example, with the new alternative sizes exceeding the corresponding actual sizes by a delta value).

For example, a stored statement is defined to allocate a parameter having a stored size of 2 Gbytes (at the beginning, with no alternative statement). An invocation of the stored statement is received by passing its parameter with an actual size of 1 kbytes. In this case, a new alternative statement is stored with the parameter having a new alternative size that slightly exceeds its actual size, for example, of 1.1 Mbytes. Later on, a further invocation of the stored statement is received now by passing its parameter with an actual size of 50 Mbytes. In this case as well, another new alternative statement is stored with the parameter having a new alternative size that slightly exceeds its actual size, for example, of 51 Mbytes. At this point, a further invocation of the stored statement is received now by passing its parameter with an actual size of 1 Mbytes. In this case, instead, the first alternative statement already has the alternative size of the parameter (1.1 Mbytes) that is slightly higher than its actual size; therefore, this alternative statement is invoked in place of the stored statement.

The above-described solution provides a flexible and effective way of managing the memory allocation (of the objects relating to the execution of the stored statements)

dynamically. Particularly, this allows managing the memory available to the database efficiently (since the size of the objects is defined at runtime as far as possible); however, this result is achieved without adding complexity to the software applications (since they are completely agnostic to the memory allocation of the database).

As a result, the software applications are decoupled from the databases that are used. Particularly, this strongly simplifies the software applications that are designed to work with multiple databases. Moreover, the porting of the software applications between different databases is significantly simplified.

The proposed solution provides both backward compatibility (since pre-existing software applications may continue working seamlessly) and backward functionality (since pre-existing software applications may leverage the corresponding advantages).

The above-mentioned advantages are especially evident in case the execution of the stored statements involves the use of large objects. Indeed, even if the large objects are defined with the size equal to a maximum value that is allowed, their use generally involves the allocation of a reduced amount of memory, corresponding to the actual size that is needed at the moment. This significantly reduces the risks of a shortage of the memory available to the database, even in case of a relatively high number of invocations of stored statements involving the allocation of large objects.

The proposed solution provides a proactive approach, which allows preventing (or at least significantly reducing) the raising of corresponding exceptions by the database, with a beneficial effect on the reliability of the database, and then of the software applications accessing it.

Figure 2:
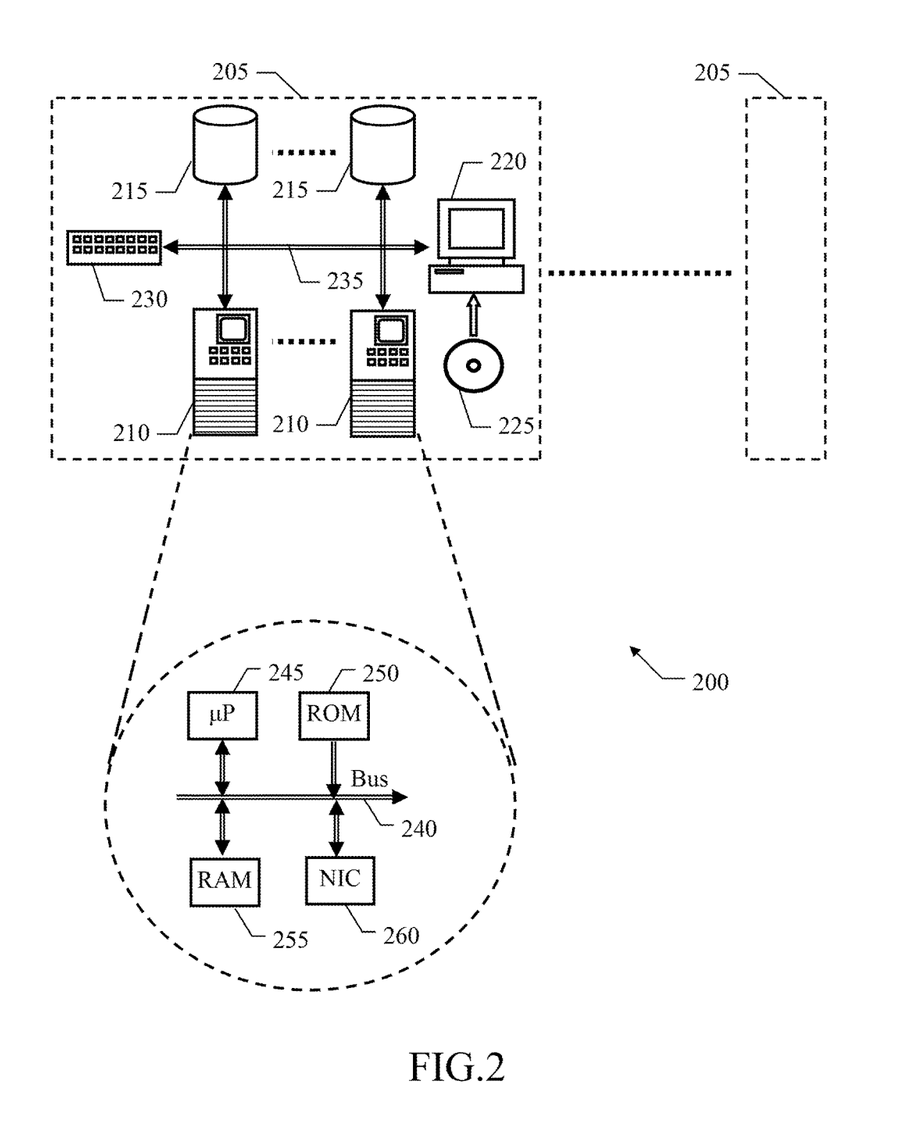
FIG. 2 shows a schematic block diagram of a computing system wherein the solution according to an embodiment of the present disclosure may be practiced.

With reference now to FIG. 2, a schematic block diagram is shown of a computing system 200 wherein the solution according to an embodiment of the present disclosure may be practiced.

The computing system 200 is implemented by one or more server farms 205. Each server farm 205 comprises several computing units 210 (for example, of the rack or blade type) and storage disks 215 (for example, of the RAID type) implementing mass memories thereof. The server farm 205 also comprises a console 220 for controlling it (for example, a personal computer, also provided with a drive for reading/writing removable storage units 225, such as optical disks like DVDs). A switch/router sub-system 230 manages any communications among the computing units 210, the disks 215, the console 220 and with a communication network, not shown (in particular, for allowing communication among the server farms 205); for this purpose, the computing units 210, the disks 215 and the console 220 are connected to the switch/router sub-system 230 through a cabling sub-system 235.

Each computing unit 210 comprises several components that are connected in parallel to a bus structure 240. Particularly, one or more microprocessors (μP) 245 control operation of the computing unit 210; a non-volatile memory (ROM) 250 stores basic code for a bootstrap of the computing unit 210 and a volatile memory (RAM) 255 is used as a working memory by the microprocessors 245. Moreover, the computing unit 210 is provided with a network adapter (NIC) 260, which is used to plug the computing unit 210 into the cabling sub-system 235.

Figure 3:
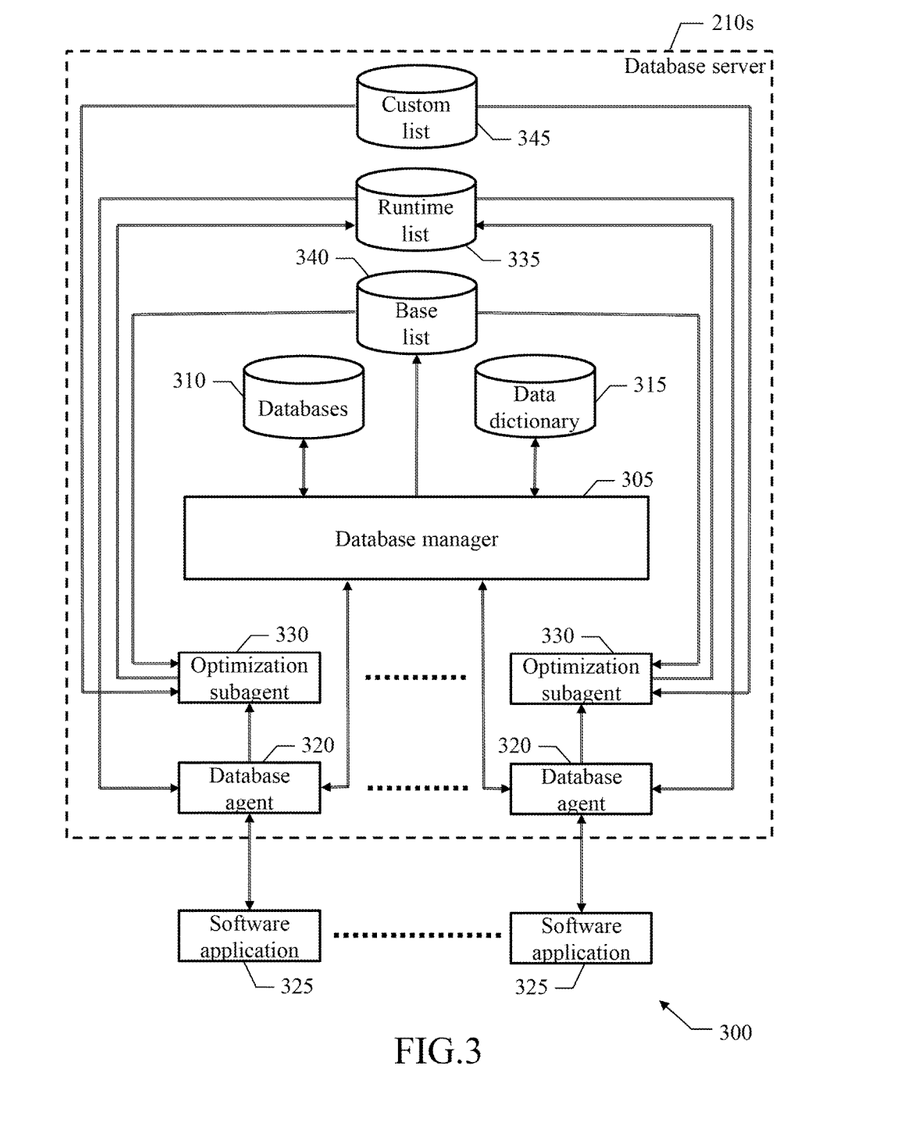
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least partially) into the working memory of each computing unit of the above-described computing system when the programs are running, together with an operating system and other application programs (not shown). The programs are initially installed into the mass memory, for example, from removable storage units or from the communication network. In this respect, each program may be a module, segment or portion of code, which comprises one or more executable instructions for implementing the specified logical function.

Particularly, a computing unit (or more), referred to as database server 210s, comprises the following software components. A database manager (or instance) 305 manages one or more databases; for example, the database manager 305 is a Relational DataBase Management System (RDBMS) in case of databases of relational type (wherein the data are organized in tables). The database manager 305 accesses (in read/write mode) one or more data units that store the physical data implementing the databases (providing a logical view thereof, in terms of their tables in this case), both of them denoted with the reference 310. Moreover, the database manager 305 accesses (in read/write mode) a data dictionary 315, which stores information relating to each database 310, comprising a definition of the stored statements that may be invoked thereon; particularly, for each stored statement the data dictionary 315 comprises its name (for invocation), source code (for maintenance) and executable code (for execution). In the solution according to an embodiment of the present disclosure, the data dictionary 315 further comprises a definition of any alternative statements of each stored statement. Particularly, each alternative statement is defined as an overloading (or ad hoc polymorphism) of the corresponding stored statement. For this purpose, the alternative statement wraps the same logic of the stored statement, but with one or more objects thereof that are defined with different (lower) sizes.

A pool of database agents 320 are used to access the databases 310. Any software applications 325 (for example, running on other computing units, such as application servers) may access a specific database 310 by connecting to one of the database agents 320. The database agent 320 serves any operation request submitted by the software application 325 for the database 310; for this purpose, the database agent 320 interacts with the database manager 305 (which actually performs the required operations on the database 310).

In the solution according to an embodiment of the present disclosure, each database agent 325 exploits an optimization subagent 330 (for example, running in a separate thread); the optimization subagent 330 manages the alternative statements of the stored statements. For this purpose, all the optimization subagents 330 access (in write mode) a runtime optimization list 335 for each database 310, which is also accessed (in read mode) by all the database agents 320. The runtime optimization list 335 is populated during the use of the database 310 with an indication of its stored statements and alternative statements (hereinafter, as a whole referred to as defined statements). Particularly, for each defined statement the runtime optimization list 335 indicates its name, with the names of the alternative statements that refer to the corresponding stored statement (for example, with the addition of a progressive index to the name of the stored statement); moreover, for each defined statement the runtime optimization list 335 indicates the stored/alternative sizes (referred to as defined sizes) of its (relevant) objects, which alternative sizes may be changed with respect to the corresponding stored sizes. The runtime optimization list 335 facilitates the above-described optimization process, since it is relatively small (as comprising only the defined statements that have been actually used).

Optionally, all the optimization subagents 330 access (in read mode) a base optimization list 340 for each database 310, which is also accessed (in write mode) by the database manager 305. The base optimization list 340 is prepared in advance with an indication of all the defined statements of the database 310. The base optimization list 340 further facilitates the above-described optimization process, at the cost of a corresponding overhead for the database manager 305.

In both cases, the sharing of the runtime optimization list 335 and of the base optimization list 340 when available (among all the optimization subagents 330 and the database agents 320) allows leveraging the same optimization by all the software applications 325 accessing the corresponding database 310.

As a further improvement, all the optimization subagents 330 access (in read mode) a custom optimization list 345 for each database 310. The custom optimization list 345 defines custom optimizations for the memory allocation of the database 310; particularly, for each custom optimization the custom optimization list 345 indicates a target tag identifying a corresponding statement to be optimized and an action tag defining how to do it. An example of custom optimization may be applied to the creation of a role for accessing the database (i.e., specific permissions/privileges that are automatically assigned to each software application 325 assigned thereto); in this case, the target tag indicates a command that is used to create a new role (for example, "create role") and the action tag indicates one or more options that may be appended to the command to define corresponding alternative statements (for example, changing its limit of connections). In this way, it is possible to provide the same advantages mentioned above to special scenarios (for example, specific for a category of software applications 325).

Figure 4A:
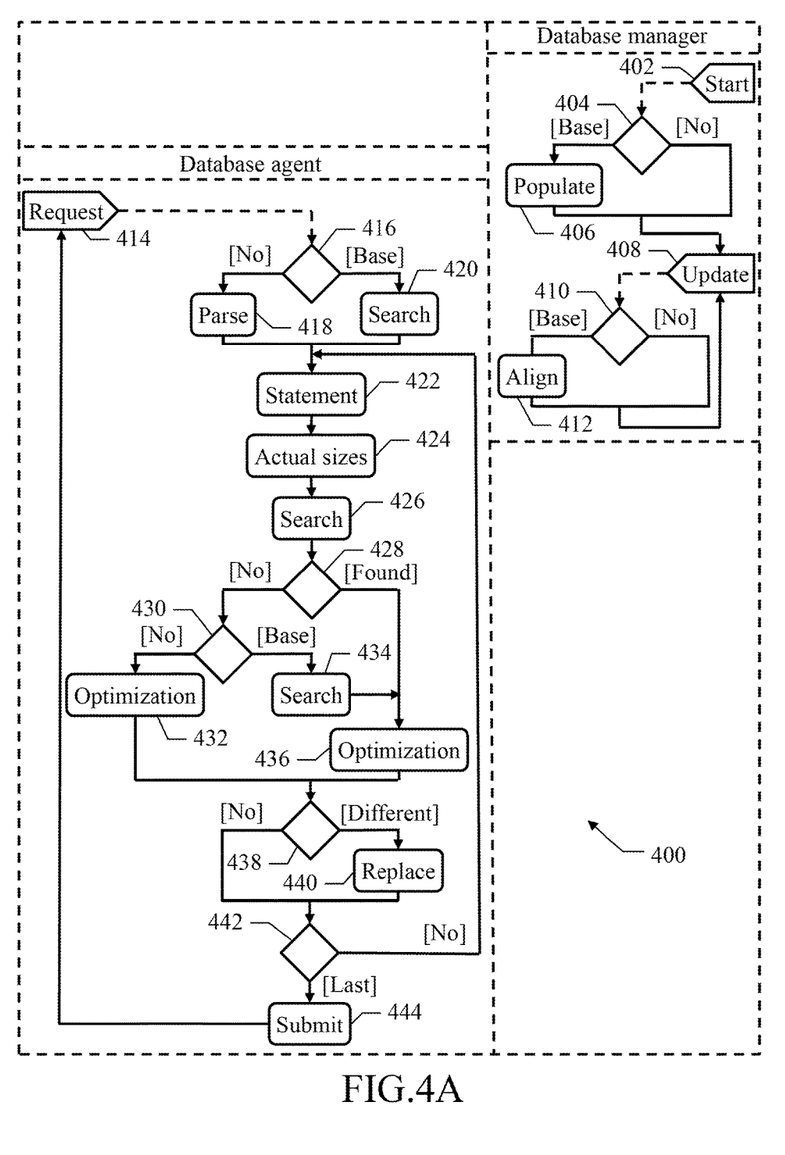
FIG. 4A-FIG. 4B show an activity diagram describing the flow of activities relating to an implementation of the solution according to an embodiment of the present disclosure.
Figure 4B:
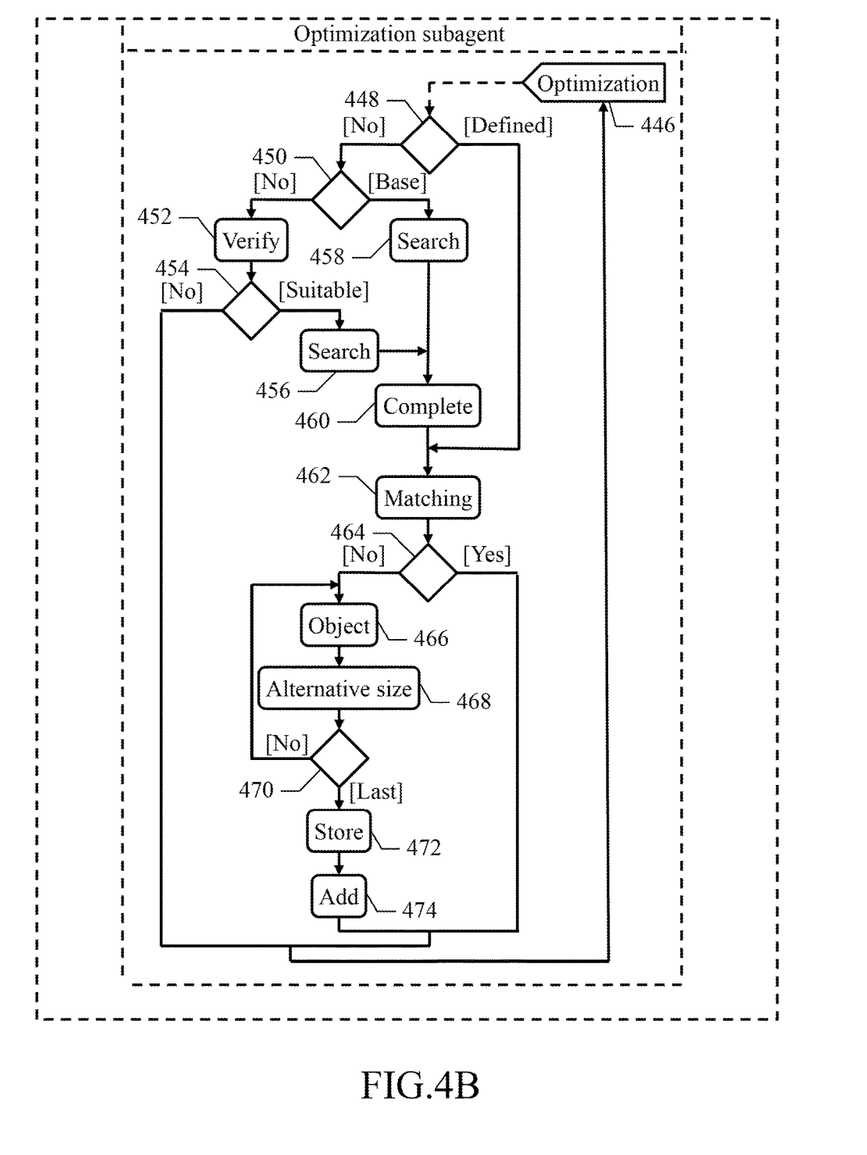

With reference now to FIG. 4A-FIG. 4B, an activity diagram is shown describing the flow of activities relating to an implementation of the solution according to an embodiment of the present disclosure.

Particularly, the diagram represents an exemplary process that may be used to manage the memory allocation in a generic database with a method 400. In this respect, each block may correspond to one or more executable instructions for implementing the specified logical function on the relevant computing machines.

The process passes from block 402 to block 404 in the swim-lane of the database manager at the startup of the database (i.e., as soon as it becomes available for connection thereto). In response thereto, the flow of activity branches according to a configuration of the database (as indicated in the data dictionary). Particularly, if the database is configured for using the base optimization list the process descends into block 406. At this point, the database manager identifies the stored statements (as indicated in the data dictionary) that are suitable to be optimized. For example, each stored statement is introspected to determine the objects relating to its execution and their stored sizes; the stored statement is deemed suitable to be optimized when one or more of its (relevant) objects have a stored size exceeding an optimization threshold (for example, 1 Mbytes). If so, the stored statement is added to the base optimization list with its name and the stored sizes of these objects (whose optimization may be substantial). Likewise, if the custom optimization list is available, each target tag indicated thereon is added to the base optimization list. The flow of activity then continues to block 408; the same point is also reached directly from the block 404 if the database is not configured for using the base optimization list. The process passes from the block 408 to block 410 as soon as any stored statement is updated (for example, by a database administrator). In response thereto, the flow of activity branches again according to the configuration of the database (as indicated in the data dictionary). Particularly, if the database is configured for using the base optimization list the process descends into block 412. At this point, the database manager aligns the base optimization list accordingly. The flow of activity then returns to the block 408 from the block 412 or directly from the block 410 (if the database is not configured for using the base optimization list) waiting for a next update of the stored statements.

In a completely independent way, the process passes from block 414 to block 416 in the swim-lane of a generic database agent (with which a connection to the database has been opened by any software application) as soon as the database agent receives an operation request from the software application. In response thereto, if the base optimization list is not available the flow of activity descends into block 418; in this case, the database agent parses the operation request for identifying any stored statements contained therein (according to its syntax and possibly the content of the custom optimization list), which stored statements are potentially suitable to be optimized. Referring back to the block 416, if the base optimization list is available the flow of activity instead descends into block 420; in this case, the database agent searches the names of any stored statements indicated in the base optimization list in the operation request, which stored statements are then actually suitable to be optimized.

The flow of activity merges again at block 422 from either the block 418 or the block 420. At this point, a loop is entered for processing the stored statements that have been found in the operation request. The loop begins with the database agent that takes a (current) stored statement into account (starting from a first one in any arbitrary order). Continuing to block 424, the database agent determines the actual sizes of the objects required by the invocation of the stored statement (for example, by analyzing the parameters that are passed by the software application). At this point, the database agent at block 426 searches the preferred statement (for the invocation of the stored statement) in the runtime optimization list. The preferred statement is searched among the defined statements corresponding to the stored statement (i.e., having their names starting with the name of the stored statement); the search is limited to the defined statements that are candidate to be invoked, since they have their defined sizes compliant to the corresponding actual sizes, i.e., each defined size is equal to or higher than the corresponding actual size. The preferred statement is determined among the (candidate) defined statements that have been found, if any, according to a preference criterion based on a comparison of the defined sizes with the actual sizes. For example, the preferred statement minimizes the sum of the differences between each defined size and the corresponding actual size; therefore, in a very simple case with two objects having the actual sizes of 20 Mbytes/1 Mbytes and two defined statements having the defined sizes of 51 Mbytes/2 Mbytes (alternative statement) and 2 Gbytes/10 Mbytes (stored statement), the preferred statement is the first one.

The flow of activity branches at block 428 according to a result of the search of the preferred statement.

Particularly, if no preferred statement has been found the process descends into block 430. At this point, if the base optimization list is not available, the database agent at block 432 requests an optimization to the corresponding optimization subagent by passing the name of the stored statement, the actual sizes of its objects and a null value for the corresponding defined sizes; for example, for this purpose the database agent queues the optimization request to the runtime optimization list. Referring back to block 430, if the base optimization list is available, the database agent at block 434 searches the preferred statement as above in the base optimization list (which preferred statement is always found, at most equal to the stored statement, assuming that the invocation of the stored statement is correct). The process then continues to block 436; the same point is also reached directly from the block 428 if the preferred statement has been found in the runtime optimization list. At this point, the database agent as above requests an optimization to the optimization subagent by passing the name of the stored statement, the actual sizes of its objects but now the defined sizes of the preferred statement as well.

The flow of activity merges again at block 438 from the block 432 or from the block 436. The database agent now verifies whether the preferred statement has been found and in this case whether the preferred statement differs from the stored statement. If so, the database agent at block 440 replaces the stored statement with the preferred statement in the operation request. The process then continues to block 442; the same point is also reached directly from the block 438 if the preferred statement has not been found or if the preferred statement is the stored statement itself. At this point, the database agent verifies whether a last stored statement has been processed. If not, the process returns to the block 422 to repeat the same operations for a next stored statement. Conversely, the loop is exit by descending into block 444 wherein the database agent submits the operation request for execution to the database manager as usual; therefore, for any stored statement that has been replaced in the operation request by the corresponding preferred statement, the preferred statement is executed in place of the stored statement (automatically by the database manager that is completely agnostic to it). The flow of activity then returns to the block 414 waiting for a next operation request from the software application.

The above described operations are quite fast, so that they are almost opaque to the operation of the database agent; therefore, the performance of the database agent, and then of the whole database, is substantially uneffaced (especially important for online accesses thereto). The impact on the operation of the database agent is even lower when the base optimization list is available. Indeed, in this case the search of the stored statements in the operation request is faster, since the names to be searched are known in advance (so that they may be found with a simple string match); moreover, the obtained result is already limited only to the stored statements that are suitable to be optimized (so that only these stored statements are processed).

In a completely independent way, the process passes from block 446 to block 448 in the swim-lane of the optimization subagent in response to any optimization request (for example, detected by monitoring the runtime optimization list for its queuing thereto). In response thereto, the optimization subagent verifies the defined sizes of the optimization request. If the defined sizes have the null value, the process descends into block 450. If the base optimization list is not available, the optimization subagent at block 452 verifies whether the stored statement (as indicated by its name in the optimization request) is suitable to be optimized as above (by introspecting it to determine the objects relating to its execution, their stored sizes and comparing them with the optimization threshold). The flow of activity then branches at block 454 according to a result of this verification. Particularly, if the stored statement is not suitable to be optimized, the process directly returns to the block 446 waiting for a next optimization request. Conversely, if the stored statement is suitable to be optimized, the process continues to block 456; in this case, as above the optimization subagent searches the preferred statement corresponding to the actual sizes (indicated in the optimization request) according to the same preference criterion among the stored statement and any preferred statements thereof that are stored in the database (in this case as well with the preferred statement that is always found, at most equal to the stored statement, assuming that the invocation of the stored statement is correct). Referring back to the block 450, if the base optimization list is available (and the search of the stored statement therein has not been performed by the database agent as described above), the process instead continues to block 458; in this case, the optimization subagent likewise searches the preferred statement corresponding to the actual sizes (indicated in the optimization request) according to the same preference criterion in the base optimization list. The process then descends into block 460 from the block 456 or from the block 458; at this point, the optimization subagent completes the optimization request by setting its defined sizes to the ones of the (relevant) objects of the preferred statement (always available).

The flow of activity then passes to block 462 from the block 460 or directly from the block 448 (if the defined sizes already have actual values). The optimization subagent now verifies whether the memory allocation of the preferred statement (as indicated by its defined sizes in the optimization request) actually matches the invocation of the stored statement (as indicated by its actual sizes in the optimization request); this verification is performed according to a matching condition based on a comparison of the defined sizes with the actual sizes. For example, the matching condition is fulfilled when the sum of the differences between each defined size and the corresponding actual size is within a matching threshold (for example, 5-15%, such as 10%, of the actual size); therefore, again in a very simple case with two objects having the actual sizes of 20 Mbytes/1 Mbytes, the matching condition is fulfilled by the defined sizes of 21 Mbytes/1 Mbytes whereas it is not fulfilled by the defined sizes of 41 Mbytes/2 Mbytes. The flow of activity then branches at block 464 according to a result of this verification.

Particularly, if the matching condition is fulfilled, the process directly returns to the block 446 waiting for a next optimization request (since no new alternative statement is required in this case). Conversely, meaning that the memory allocation of the preferred statement significantly differs from the invocation of the stored statement, a corresponding new alternative statement is created. For this purpose, a loop is performed for processing the (relevant) objects of the preferred statement (as indicated by the defined sizes in the optimization request). The loop begins at block 466 wherein the optimization subagent takes a (current) object into account (starting from a first one in any arbitrary order). Continuing to block 468, the optimization subagent calculates the corresponding (new) alternative size; for example, the new alternative size is calculated by the following formula:

$$Salt = Sact + MIN(\Delta\ max, (Sdef - Sact)/2),$$

wherein Salt is the new alternative size, Sact is the actual size, Sdef is the defined size and Δ max is a maximum value (for example, 0.5-2 Mbytes, such as 1 Mbytes). Therefore, the new alternative size exceeds the actual size by a delta value, which depends on the defined size and the actual size but in any case is clipped to the maximum value. In this way, the new alternative size is slightly higher than the actual size but in any case sufficiently spaced apart from the defined size, so as to increase the likelihood of being useful for similar next invocations of the stored statement. A test is then made at block 470 wherein the optimization subagent verifies whether a last object has been processed. If not, the process returns to the block 466 to repeat the same operations for a next object. Conversely, the loop is exit by descending into block 472. At this point, the optimization subagent stores the new alternative statement so defined in the database. The new alternative statement has a name that is derived from the name of the stored statement (as indicated in the optimization request), for example, by increasing its progressive index; each (relevant) object of the new alternative statement is defined with its new alternative size. Continuing to block 474, the optimization subagent adds a new entry to the runtime optimization list for the new alternative statement with its name and new alternative sizes. The process then returns to the block 446 waiting for a next optimization request.

In the above-described embodiment, most of the operations required for creating the new alternative statements are performed asynchronously (by the optimization subagent) with respect to the serving of the operation requests submitted to the database agent; this allows making their effect on the performance of the database agent, and then of the whole database, substantially negligible (especially important for online accesses thereto).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing memory allocation in a database. However, the memory to be allocated may be of any type (for example, mass memory, working memory, cache memory) and the database may be of any type, even with a dynamic memory allocation (for example, an object-oriented database).

In an embodiment, the method comprises receiving an invocation of a stored statement (among one or more stored statements that are stored in the database). However, the stored statements may be in any number and of any type (for example, stored procedures, user-defined functions, prepared queries, custom statements or any combination thereof), and their invocation may be received in any way (for example, from a software program in online or batch mode, from a command submitted by a user).

In an embodiment, the stored statement is defined to allocate one or more objects each one with a stored size. However, the objects may be in any number and of any type (for example, parameters, columns, results, working areas and any combination thereof).

In an embodiment, the method comprises determining an actual size relating to the invocation of the stored statement of at least part of the objects. However, the actual sizes may be determined for any number of objects (for example, all the objects relating to the execution of the stored statement indiscriminately or only some of them selected with any criterion defining their relevance) and in any way (for example, by analyzing the parameters, columns that are passed and/or by estimating the corresponding results, working areas).

In an embodiment, the method comprises determining a preferred statement among one or more defined statements with defined sizes of the objects, which defined statements comprise the stored statement and any alternative statements stored in the database; each alternative statement provides an alternative implementation of the stored statement that is defined to allocate the objects with alternative sizes at least in part lower than the corresponding stored sizes. However, the alternative statements may be in any number and stored in any way (for example, together or separately from the stored statements); moreover, the alternative sizes may have any values (for example, differing from the stored sizes by at least a minimum value).

In an embodiment, the preferred statement has the defined sizes that are compliant to the corresponding actual sizes according to a preference criterion based on a comparison of the defined sizes with the actual sizes. However, the preference criterion may be of any type (for example, the lowest maximum difference between each defined size and the corresponding actual size).

In an embodiment, the method comprises invoking the preferred statement for execution (with the preferred statement that is invoked in place of the stored statement when different therefrom). However, the preferred statement may be invoked in any way (for example, by invoking the same stored statement with the defined sizes of the preferred statement).

In an embodiment, the method comprises storing a new alternative statement in the database in response to a missing fulfillment of a matching condition, which is based on a comparison of the defined sizes of the preferred statement with the actual sizes. However, the matching condition may be of any type (for example, a maximum difference between each defined size and the corresponding actual size).

In an embodiment, the new alternative statement has new alternative sizes that are compliant to the corresponding actual sizes according to an alternative criterion. However, the alternative criterion may be of any type (for example, with the new alternative sizes equal to the corresponding actual sizes, always or only when they exceed a minimum value).

In an embodiment, said step of storing a new alternative statement is performed asynchronously after said step of invoking the preferred statement. However, this operation may be triggered in any way (for example, by an explicit request of the database agent); in any case, the possibility of waiting for the storing of the new alternative statement (when the preferred statement does not fulfill the matching criterion) and then invoking it in place of the stored statement is not excluded (for example, when the optimization of the memory allocation is far more important than the performance of the database, such as in batch mode).

In an embodiment, the method comprises searching the preferred statement in a runtime optimization list. However, the runtime optimization list may be of any type (for example, a lookup table, an array); in any case, the possibility is not excluded of searching the preferred statement in another way (for example, always in the base optimization list or even directly in the database).

In an embodiment, the method comprises adding an indication of the new alternative statement to the runtime optimization list in response to the storing thereof. However, the runtime optimization list may be populated in different, alternative or additional ways (for example, by adding the preferred statement as well).

In an embodiment, the method comprises adding an indication of the defined statements to a base optimization list in response to a starting of the database. However, the base optimization list may be of any type (either the same or different with respect to the runtime optimization list); moreover, the base optimization list may be always available, only for specific databases or never.

In an embodiment, the method comprises updating the base optimization list in response to any update of the defined statements. However, this operation may be performed in any way (for example, either synchronously or asynchronously).

In an embodiment, the method comprises searching the preferred statement in the base optimization list in response to a negative result of the searching of the preferred statement in the runtime optimization list. However, the content of the base optimization list may be used in different, alternative or additional ways (for example, for initializing the runtime optimization list, only for the creation of the new alternative statements).

In an embodiment, said receiving an invocation of a stored statement comprises receiving an operation request for the database. However, the operation request may be of any type (for example, comprising any number of stored statements, down to a single one alone).

In an embodiment, the method comprises identifying the invocation of each stored statement by searching the invocation of each stored statement indicated in the base optimization list in the operation request. However, the stored statements may be identified always by using the base optimization list, only in part or never.

In an embodiment, the runtime optimization list and/or the base optimization list are shared among a plurality of clients accessing the database. However, the clients may be in any number and of any type (see above); moreover, the possibility is not excluded of sharing anyone of the lists or both of them among all the database agents, only among part of them or never.

In an embodiment, said step of storing a new alternative statement comprises defining the new alternative statement as an overloading of the stored statement. However, the new alternative statement may be defined in different, alternative or additional ways (for example, by casting some objects to different, less memory demanding, types).

In an embodiment, the matching condition is defined by a difference between the defined sizes and the actual sizes within a matching threshold. However, the matching threshold may have any value, and it may relate to each pair of replacement size and actual size individually or to all of them as a whole.

In an embodiment, the alternative criterion is defined by each new alternative size exceeding the corresponding actual size by a non-zero delta value. However, the non-zero delta value may be of any type (in either relative or absolute terms, defined individually for each actual size or the same for all of them).

In an embodiment, said step of storing a new alternative statement comprises calculating the delta value of each new alternative size according to the corresponding defined size of the preferred statement and actual size. However, the delta value may be calculated in any way (for example, as any percentage of the difference/ratio between the defined size and the actual size); however, the possibility of using a fixed delta value is not excluded.

In an embodiment, said step of calculating the delta value comprises clipping the delta value to a maximum value. However, the maximum value may be of any type (either defined individually for each actual size or the same for all of them) or it may also be omitted.

In an embodiment, said step of receiving an invocation, said step of determining an actual size, said step of determining a preferred statement and said step of storing a new alternative statement are performed by at least one external component to a database manager of the database. However, the external components may be in any number (down to the database agent only) and of any type (for example, running in different threads or processes); in any case, the possibility is not excluded of implementing the same solution directly in the database manager.

In embodiment, said step of invoking the preferred statement comprises submitting the preferred statement to the database manager by said at least one external component. However, the preferred statement may be submitted to the database manager in any way (for example, by the optimization subagent after its storing).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the software program may be implemented as a stand-alone module, as a plug-in for a pre-existing software program (for example, the database agent), or even directly in the latter; moreover, the software program may run on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each one of the steps of the above-mentioned method. An embodiment provides a system comprising a circuitry (i.e., any hardware suitably configured, for example, by software) configured for performing each one of the steps of the same method. However, the system may be of any type (for example, a physical and/or a virtual computing machine, a distributed architecture based on a local, wide area, global, cellular or satellite network and exploiting any type of wired and/or wireless connections).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing memory allocation in a database, the method comprising:
    determining a preferred statement among one or more defined statements with defined sizes of objects, the defined statements including (i) a stored statement defined to allocate the objects and stored in the database wherein each of the objects have a stored size, and (ii) any alternative statements stored in the database, each of the alternative statements providing an alternative implementation of the stored statement that is defined to allocate the objects with alternative sizes at least in part lower than corresponding stored sizes, the preferred statement having the defined sizes compliant to corresponding actual sizes according to a preference criterion based on a comparison of the defined sizes with the actual sizes;
    invoking the preferred statement for execution, the preferred statement being invoked in place of the stored statement when different therefrom; and
    storing a new alternative statement in the database in response to a missing fulfilment of a matching condition based on a comparison of the defined sizes of the preferred statement with the actual sizes, the new alternative statement having new alternative sizes that are compliant to the corresponding actual sizes according to an alternative criterion.

2. The method of claim 1, wherein said storing a new alternative statement is performed asynchronously after said invoking the preferred statement.

3. The method of claim 1, further comprising:
    searching the preferred statement in a runtime optimization list; and
    adding an indication of the new alternative statement to the runtime optimization list in response to the storing thereof.

4. The method of claim 3, further comprising:
    adding an indication of the defined statements to a base optimization list in response to a starting of the database;
    updating the base optimization list in response to any update of the defined statements; and
    searching the preferred statement in the base optimization list in response to a negative result of the searching of the preferred statement in the runtime optimization list.

5. The method of claim 4, further comprising receiving an invocation of the stored statement among one or more stored statements being stored in the database by receiving an operation request for the database, and identifying the invocation of each stored statement by searching the invocation of each stored statement indicated in the base optimization list in the operation request.

6. The method of claim 4, wherein at least one list selected from the group consisting of the runtime optimization list and the base optimization list is shared among a plurality of clients accessing the database.

7. The method of claim 4, wherein said receiving an invocation, said determining a preferred statement and said storing a new alternative statement are performed by at least one external component to a database manager of the database, and wherein said invoking the preferred statement comprises submitting the preferred statement to the database manager by said at least one external component.

8. The method of claim 1, wherein said storing a new alternative statement comprises defining the new alternative statement as an overloading of the stored statement.

9. The method of claim 1, wherein the matching condition is defined by a difference between the defined sizes and the actual sizes within a matching threshold.

10. The method of claim 1, wherein the alternative criterion is defined by each new alternative size exceeding the corresponding actual size by a non-zero delta value.

11. The method of claim 10, wherein said storing a new alternative statement comprises calculating the delta value of each new alternative size according to the corresponding defined size of the preferred statement and actual size.

12. The method of claim 11, wherein said calculating the delta value comprises clipping the delta value to a maximum value.

13. A computer program product for managing memory allocation in a database, the computer program product comprising a computer readable storage medium having program instructions embodied therewith, the program instructions being executable by a computing system to cause the computing system to perform a method comprising:
    determining a preferred statement among one or more defined statements with defined sizes of objects, the defined statements including (i) a stored statement defined to allocate the objects and stored in the database wherein each of the objects have a stored size, and (ii) any alternative statements stored in the database, each one of the alternative statement providing an alternative implementation of the stored statement that is defined to allocate the objects with alternative sizes at least in part lower than corresponding stored sizes, the preferred statement having the defined sizes compliant to corresponding actual sizes according to a preference criterion based on a comparison of the defined sizes with the actual sizes;
    invoking the preferred statement for execution, the preferred statement being invoked in place of the stored statement when different therefrom; and storing a new alternative statement in the database in response to a missing fulfilment of a matching condition based on a comparison of the defined sizes of the preferred statement with the actual sizes, the new alternative statement having new alternative sizes that are compliant to the corresponding actual sizes according to an alternative criterion.

14. The computer program product of claim 13, wherein said storing a new alternative statement is performed asynchronously after said invoking the preferred statement.

15. The computer program product of claim 13, wherein the method further comprises:
   searching the preferred statement in a runtime optimization list; and
   adding an indication of the new alternative statement to the runtime optimization list in response to the storing thereof.

16. The computer program product of claim 15, wherein the method further comprises:
   adding an indication of the defined statements to a base optimization list in response to a starting of the database;
   updating the base optimization list in response to any update of the defined statements; and
   searching the preferred statement in the base optimization list in response to a negative result of the searching of the preferred statement in the runtime optimization list.

17. The computer program product of claim 16, further comprising receiving an invocation of the stored statement among one or more stored statements being stored in the database by receiving an operation request for the database, and identifying the invocation of each stored statement by searching the invocation of each stored statement indicated in the base optimization list in the operation request.

18. The computer program product of claim 16, wherein at least one list selected from the group consisting of the runtime optimization list and the base optimization list is shared among a plurality of clients accessing the database.

19. The computer program product of claim 13, wherein said storing a new alternative statement comprises defining the new alternative statement as an overloading of the stored statement.

20. A system for managing memory allocation in a database, wherein the system comprises:
   a circuitry for determining a preferred statement among one or more defined statements with defined sizes of objects, the defined statements including (i) a stored statement defined to allocate the objects and stored in the database wherein each of the objects have a stored size, and (ii) any alternative statements stored in the database, each one of the alternative statements providing an alternative implementation of the stored statement being defined to allocate the objects with alternative sizes at least in part lower than corresponding stored sizes, the preferred statement having the defined sizes compliant to corresponding actual sizes according to a preference criterion based on a comparison of the defined sizes with the actual sizes;
   a circuitry for invoking the preferred statement for execution, the preferred statement being invoked in place of the stored statement when different therefrom; and
   a circuitry for storing a new alternative statement in the database in response to a missing fulfilment of a matching condition based on a comparison of the defined sizes of the preferred statement with the actual sizes, the new alternative statement having new alternative sizes that are compliant to the corresponding actual sizes according to an alternative criterion.

* * * * *